US009788174B2

(12) United States Patent
Bendi et al.

(10) Patent No.: US 9,788,174 B2
(45) Date of Patent: Oct. 10, 2017

(54) CENTRALIZED SHORT MESSAGE SERVICE CENTER SERVER FOR MESSAGING

(71) Applicants: Verizon Patent and Licensing Inc., Arlington, VA (US); Cellco Partnership, Arlington, VA (US)

(72) Inventors: Sethumadhav Bendi, Walnut Creek, CA (US); Lalit R. Kotecha, San Ramon, CA (US); Mingxing S. Li, San Jose, CA (US); Kumar Sanjeev, San Ramon, CA (US); Priscilla Lau, Fremont, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/296,174

(22) Filed: Jun. 4, 2014

(65) Prior Publication Data
US 2015/0358789 A1 Dec. 10, 2015

(51) Int. Cl.
*H04W 4/14* (2009.01)

(52) U.S. Cl.
CPC ................................. *H04W 4/14* (2013.01)

(58) Field of Classification Search
CPC ........ H04W 4/12; H04W 88/184; H04W 4/14
USPC ........ 455/466, 411, 428, 433; 370/328, 253, 370/312, 313, 349, 395.1; 709/206, 207; 713/170, 168
See application file for complete search history.

(56) References Cited

U.S. PATENT DOCUMENTS

| | | | | |
|---|---|---|---|---|
| 8,451,988 | B2* | 5/2013 | Cai et al. | 379/88.11 |
| 2004/0148416 | A1* | 7/2004 | Aarnos | H04L 29/12066 709/230 |
| 2004/0185848 | A1* | 9/2004 | Phan-Anh | H04W 8/12 455/435.1 |
| 2005/0064887 | A1* | 3/2005 | Bengtsson | H04L 51/38 455/466 |
| 2006/0256748 | A1* | 11/2006 | Jung | H04L 65/103 370/328 |
| 2010/0124318 | A1* | 5/2010 | Cai | H04M 3/42382 379/93.24 |
| 2012/0094685 | A1* | 4/2012 | Marsico | H04W 4/021 455/456.1 |
| 2013/0070667 | A1* | 3/2013 | Ku | H04L 12/2636 370/328 |

OTHER PUBLICATIONS

"ETSI TS 123 204 V7.6.0," 3GPP TS 23.204 version 7.6.0 Release 7, Mar. 2009 (available at http://www.etsi.org/deliver/etsi_ts/123200_123299/123204/07.06.00_60/ts_123204v070600p.pdf, visited May 2014).

* cited by examiner

Primary Examiner — Kamran Afshar
Assistant Examiner — Nicole Louis-Fils

(57) ABSTRACT

A server device may receive a message from a first user device, the message being destined for a second user device; determine a call session control function (CSCF) server device associated with the second user device; and output, based on the determining, the message to the CSCF server device.

10 Claims, 10 Drawing Sheets

CENTRALIZED SHORT MESSAGE SERVICE CENTER SERVER FOR MESSAGING

BACKGROUND

User devices may be used to transmit messages, such as short message service (SMS) messages, multimedia service (MMS) messages, and/or some other type of messages. Short message service center (SMSC) servers may be deployed in a cellular network to facilitate the transmission of a message from a sender to a recipient. Each SMSC server may be associated with particular user devices (e.g., user devices located in a particular geographic region). When transmitting a message from a sender user device to a recipient user device, an SMSC server associated with a sender user device may need to identify the SMSC server associated with the recipient user device, and transmit the message to the recipient user device via the SMSC server associated with the recipient user device.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may utilize session initiation protocol (SIP) signaling when transmitting messages (e.g., short message service (SMS) messages, multimedia service (MMS) messages, etc.) between user devices, and eliminating the use of the signaling system number 7 (SS7) protocols. For example, the use of SS7 protocols, used in accordance with traditional messaging techniques, may be eliminated by eliminating the communication between multiple de-centralized short message service center (SMSC) servers. In some implementations, the functionality of multiple de-centralized SMSC servers may be centralized in order to eliminate the communication between the multiple de-centralized SMSC servers. As a result, transmission times may be reduced for the transmission of messages in relation to when de-centralized SMSC servers are used to transmit messages via SS7 protocols.

Figure 1:
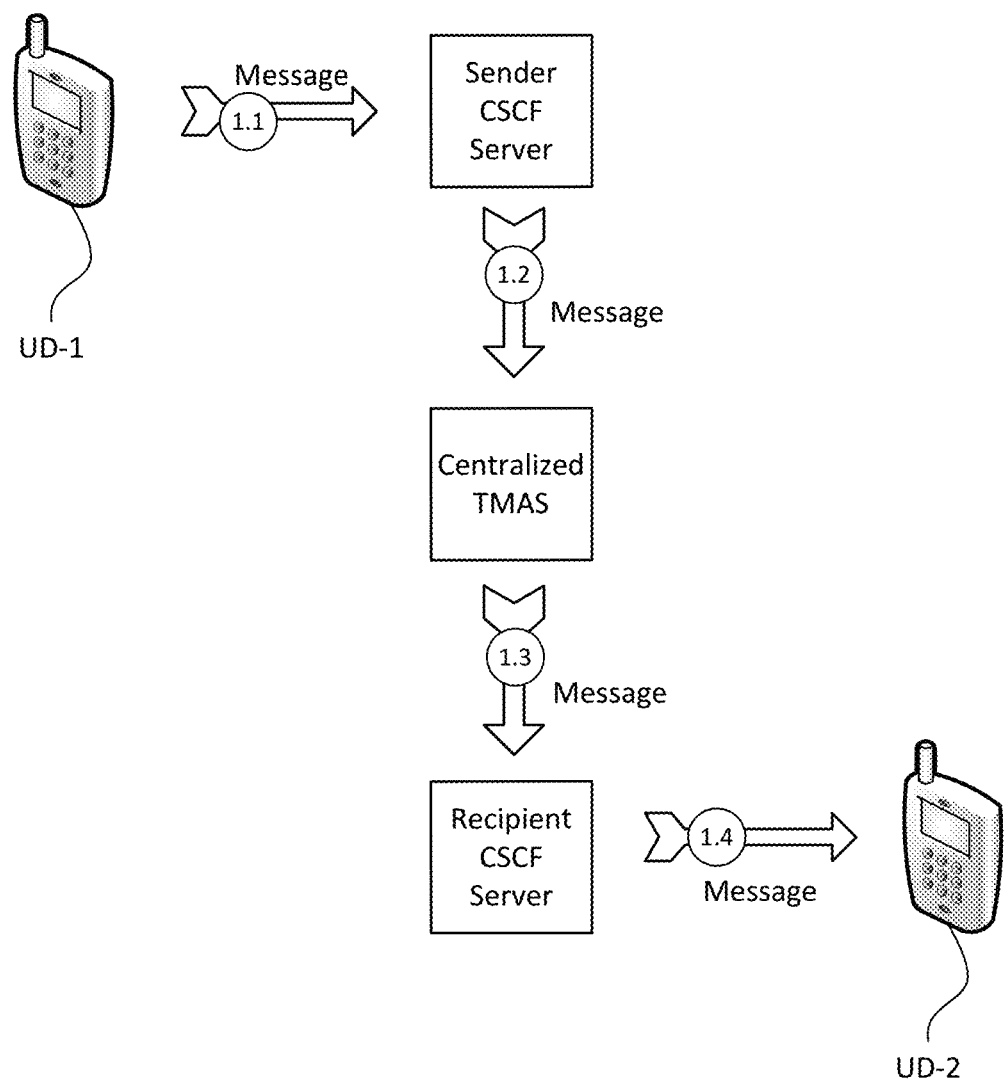
FIG. 1 illustrates an example overview of an implementation described herein.

FIG. 1 illustrates an example overview of an implementation described herein. As shown in FIG. 1, a first user device (UD-1) may output a message (arrow 1.1) destined for a second user device (UD-2). A call service control function (CSCF) server associated with UD-1 (e.g., a sender CSCF server) may receive the message, and may output the message (arrow 1.2) to a centralized text messaging application server (TMAS). The centralized TMAS may function as multiple de-centralized SMSC servers. The centralized TMAS may output the message (arrow 1.3) to a CSCF server associated with UD-2 (e.g., a recipient CSCF server), and the recipient CSCF server may output the message to UD-2 (arrow 1.4). As a result, multiple de-centralized SMSC servers may not be involved in the transmission of the message, thereby reducing the transmission time of the message in relation to when multiple de-centralized SMSC servers are involved in the transmission of the message (e.g., by eliminating communications between the multiple de-centralized SMSC servers via SS7 protocols).

Figure 2:
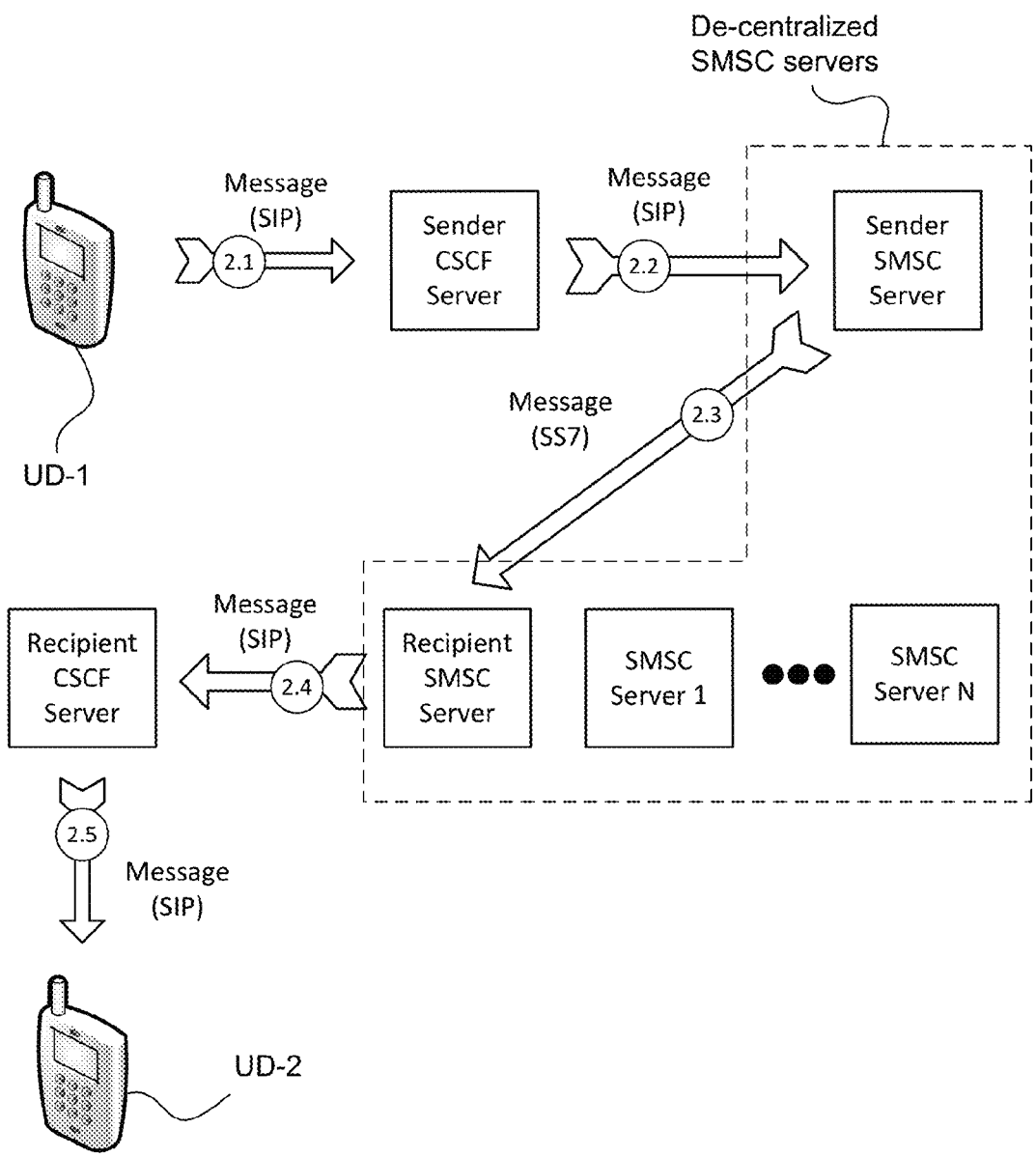
FIG. 2 illustrates an example in which transmitting a message via a centralized SMSC server may be desirable.

FIG. 2 illustrates an example in which transmitting a message via a centralized TMAS may be desirable. As shown in FIG. 2, UD-1 may output a message (arrow 2.1) destined for UD-2. The CSCF server associated with UD-1 (e.g., the sender CSCF server) may receive the message, and output the message to an SMSC server associated with UD-1 (e.g., a sender SMSC server). The sender SMSC server may identify a particular SMSC server (e.g., a recipient SMSC server associated with UD-2), out of a group of de-centralized SMSC servers (e.g., SMSC servers that each facilitate the transmission of messages for user devices associated with a particular region).

The sender SMSC server may output the message to the recipient SMSC server via SS7 protocols (arrow 2.3). The recipient SMSC server may output the message to UD-2 via a recipient CSCF server (arrows 2.4 and 2.5). As shown in FIG. 2, the sender SMSC server and the recipient SMSC server may be part of a group of de-centralized SMSC servers that may be scattered across a service provider network (e.g., a network associated with a cellular service provider). As a result, multiple SMSC servers may be involved in the transmission of the message using SS7 protocols, thereby increasing transmission times in relation to when the functionality of the multiple SMSC servers are virtualized and implemented by a centralized TMAS in which communication via SS7 protocols is eliminated.

Figure 3A:
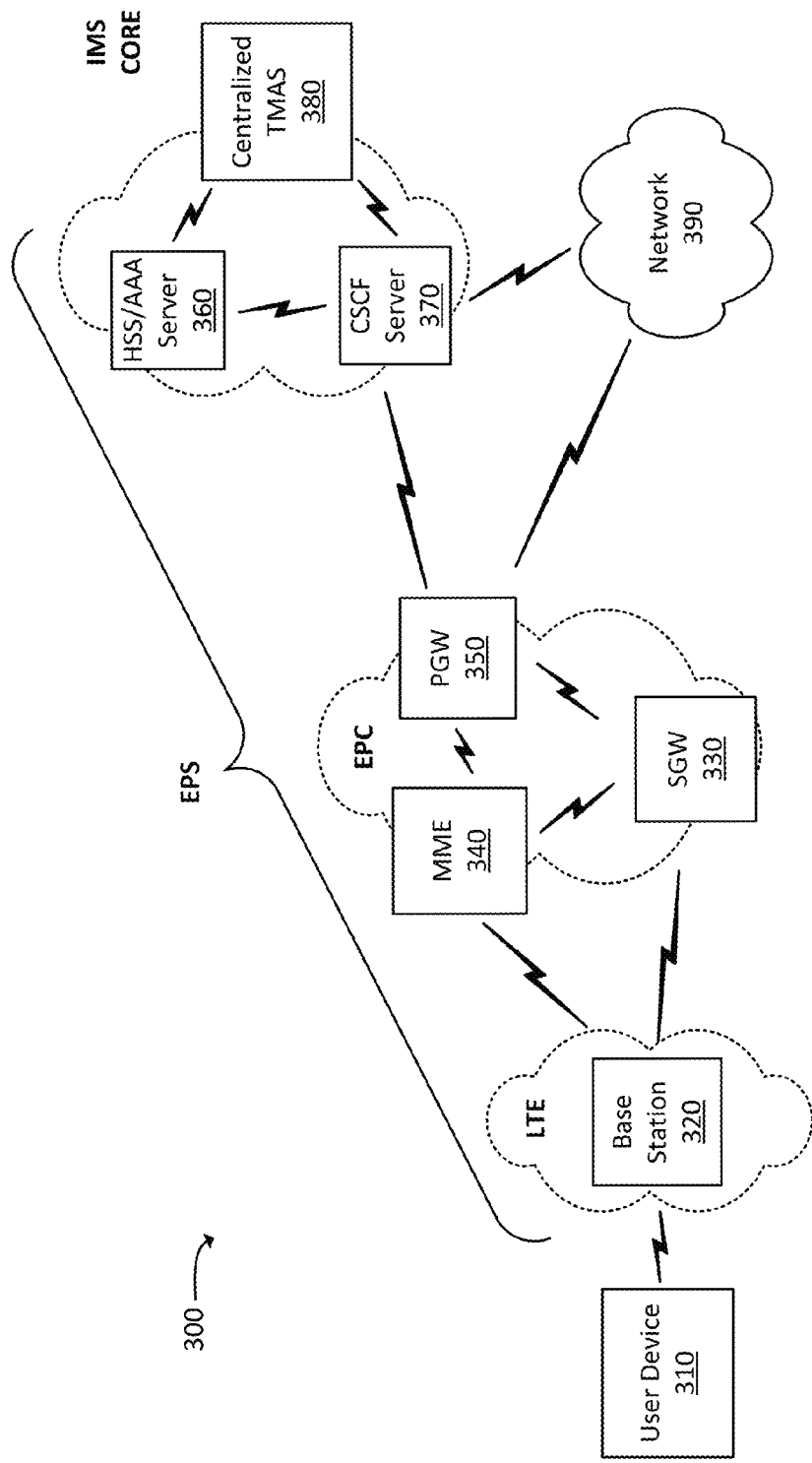
FIG. 3A illustrates an example environment in which systems and/or methods, described herein, may be implemented.

FIG. 3A is a diagram of an example environment 300 in which systems and/or methods described herein may be implemented. As shown in FIG. 3A, environment 300 may include user device 310, a base station 320, a serving gateway 330 (referred to as "SGW 330"), a mobility management entity device 340 (referred to as "MME 340"), a packet data network (PDN) gateway (PGW) 350 (referred to as "PGW 350"), a home subscriber server (HSS)/authentication, authorization, accounting (AAA) server 360 (referred to as an "HSS/AAA server 360"), a call service control function (CSCF) server 370 (referred to as "CSCF server 370"), centralized TMAS 380, and a network 390.

Environment 300 may include an evolved packet system (EPS) that includes a long term evolution (LTE) network, an evolved packet core (EPC), and/or an Internet protocol (IP) multimedia subsystem (IMS) core that operate based on a third generation partnership project (3GPP) wireless communication standard. The LTE network may be a radio access network (RAN) that includes one or more base stations 320, such as eNodeBs (eNBs), via which user device 310 communicates with the EPC. The EPC may include SGW 330, MME 340, and/or PGW 350 and may enable user device 310 to communicate with network 390 and/or the IMS core. The IMS core may include HSS/AAA server 360, CSCF server 370, and/or centralized TMAS 380. The IMS core may manage authentication, connection initiation, account information, a user profile, etc. associated with user device 310.

User device 310 may include a computation or communication device, such as a wireless mobile communication device that is capable of communicating with base station 320 and/or a network (e.g., network 390). For example, user device 310 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of computation or communication device. User device 310 may send data to and/or receive data from network 390.

Base station 320 may include one or more network devices that receive, process, and/or transmit traffic, such as audio, video, text, and/or other data, destined for and/or received from user device 310. In an example implementation, base station 320 may be an eNB device and may be part of the LTE network. Base station 320 may receive traffic from and/or send traffic to network 390 via SGW 330 and PGW 350. Base station 320 may send traffic to and/or receive traffic from user device 310 via an air interface. One or more of base stations 330 may be associated with a RAN, such as the LTE network.

SGW 330 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 330 may, for example, aggregate traffic received from one or more base stations 330 and may send the aggregated traffic to network 390 via PGW 350. In one example implementation, SGW 330 may route and forward user data packets, may act as a mobility anchor for a user plane during inter-eNB handovers, and may act as an anchor for mobility between LTE and other 3GPP technologies.

MME 340 may include one or more network devices that perform operations associated with a handoff to and/or from the EPS. MME 340 may perform operations to register user device 310 with the EPS, to handoff user device 310 from the EPS to another network, to handoff a user device 310 from the other network to the EPS, and/or to perform other operations. MME 340 may perform policing operations for traffic destined for and/or received from user device 310. MME 340 may authenticate user device 310 (e.g., via interaction with HSS/AAA server 360).

PGW 350 may include one or more network devices, such as a gateway, a router, a modem, a switch, a firewall, a NIC, a hub, a bridge, a proxy server, an OADM, or some other type of device that processes and/or transfers traffic. PGW 350 may, for example, provide connectivity of user device 310 to external packet data networks by being a traffic exit/entry point for user device 310. PGW 350 may perform policy enforcement, packet filtering, charging support, lawful intercept, and/or packet screening. PGW 350 may also act as an anchor for mobility between 3GPP and non-3GPP technologies.

HSS/AAA server 360 may include one or more computing devices, such as a server device or a collection of server devices. In some implementations, HSS/AAA server 360 may include a device that gathers, processes, searches, stores, and/or provides information in a manner described herein. For example, HSS/AAA server 360 may manage, update, and/or store, in a memory associated with HSS/AAA server 360, profile information associated with user device 310 that identifies applications and/or services that are permitted for and/or accessible by user device 310, bandwidth or data rate thresholds associated with the applications or services, information associated with a user of user device 310 (e.g., a username, a password, a personal identification number (PIN), etc.), rate information, minutes allowed, and/or other information. Additionally, or alternatively, HSS/AAA server 360 may include a device that performs authentication, authorization, and/or accounting (AAA) operations associated with a communication connection with user device 310.

HSS/AAA server 360 may store information mapping a particular CSCF server 370 to a particular user device 310 (e.g., based on a user device identifier (ID) of user device 310, a telephone number of user device 310, an international mobile subscriber identifier (IMSI) of user device 310, an international mobile equipment identifier (IMEI) of user device 310, and/or some other information regarding user device 310). HSS/AAA server 360 may maintain information identifying the CSCF server 370 associated with user device 310 based on network registration information associated with user device 310. For example, HSS/AAA server 360 may identify that user device 310 is associated with a particular CSCF server 370 based on a location of user device 310, an identifier of a particular base station 320 with which user device 310 communicates, and/or based on some other information.

CSCF server 370 may include one or more computing devices, such as a server device or a collection of server devices. In some implementations, CSCF server 370 may include a device that gathers, processes, searches, stores, and/or provides information in a manner described herein. CSCF server 370 may process and/or route calls to and from user device 310 via the EPC. For example, CSCF server 370 may process calls, received from network 390, that are destined for user device 310. In another example, CSCF server 360 may process calls and/or messages (e.g., SMS messages, MMS messages, etc.), received from user device 310, that are destined for network 390.

Centralized TMAS 380 may include one or more computing devices, such as a server device or a collection of server devices. In some implementations, centralized TMAS 380 may centralize the functionality of multiple SMSC servers associated with different groups of user devices 310. For example, centralized TMAS 380 may virtualize the functionality of the multiple SMSC servers by implementing a virtual machine and/or a virtual image for each SMSC server. Centralized TMAS 380 may function as an application server to transmit a message originating from a sending user device 310 to a recipient user device 310. For example, centralized TMAS 380 may receive a message destined for the recipient user device 310, and output the message to a CSCF server 370 associated with the recipient user device 310 without involving a physical SMSC server associated with recipient user device 310.

Network 390 may include one or more wired and/or wireless networks. For example, network 390 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 390 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 300 is not limited to what is shown in FIG. 3A. In practice, environment 300 may include additional devices and/or networks; fewer devices and/or networks; different devices and/or networks; or differently arranged devices and/or networks than illustrated in FIG. 3A. Also, in some implementations, one or more of the devices of environment 300 may perform one or more functions described as being performed by another one or more of the devices of environment 300. Devices of environment 300 may interconnect via wired connections, wireless connections, or a combination of wired and wireless connections.

Figure 3B:
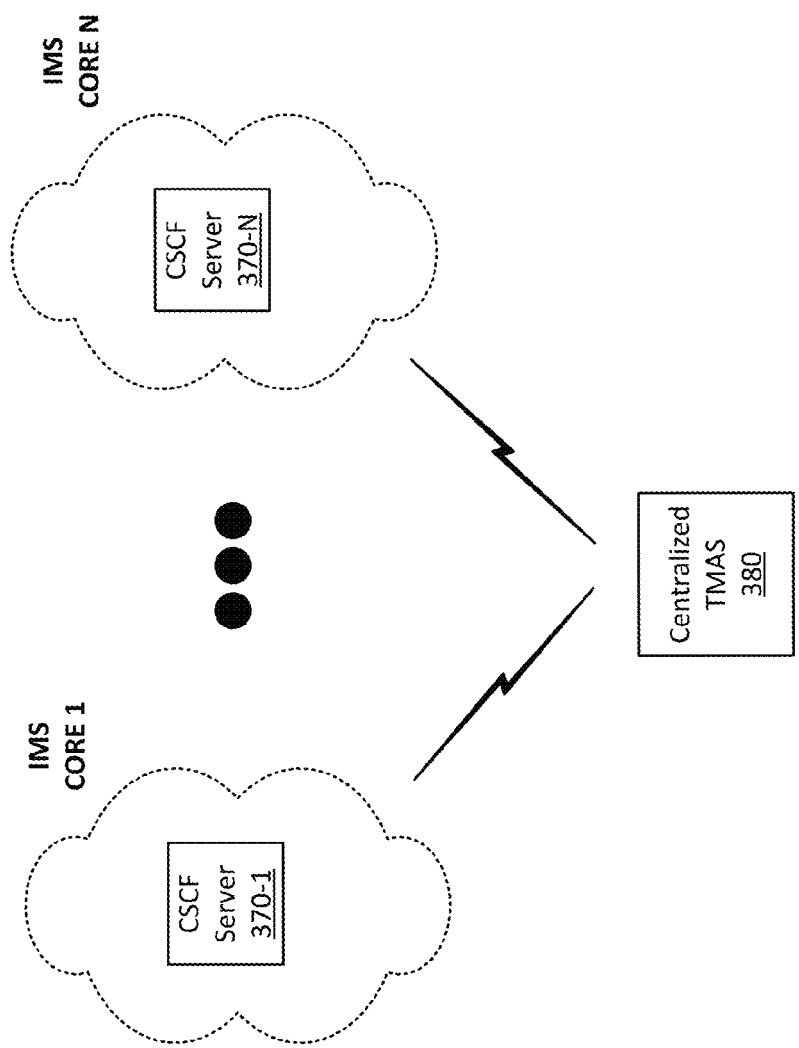
FIG. 3B illustrates a centralized text messaging application server communicating with multiple different call service control function servers.

FIG. 3B illustrates a centralized TMAS communicating with multiple different CSCF servers. As shown in FIG. 3B, centralized TMAS 380 may communicate with CSCF servers 370-1 through 370-N, where N is an integer greater than or equal to 1. Each CSCF server 370 may be associated with a respective IMS core that communicates with user devices 310 associated with a particular geographic area. In some implementations, CSCF server 370 and centralized TMAS 380 may communicate via SIP protocols to facilitate the transmission of messages between user devices 310.

Figure 4:
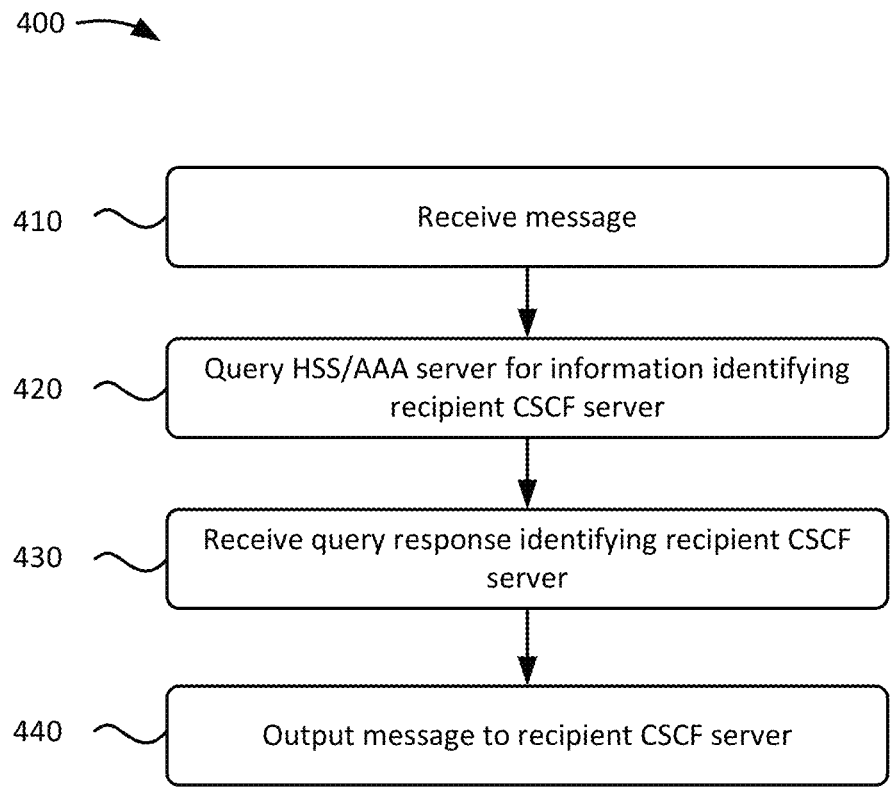
FIG. 4 illustrates a flowchart of an example process for outputting a message to a recipient CSCF server via a centralized SMSC server.

FIG. 4 illustrates a flowchart of an example process 400 for outputting a message to a recipient CSCF server via a centralized TMAS. In some implementations, process 400 may be performed by centralized TMAS 380. In some implementations, some or all of blocks of process 400 may be performed by one or more other devices.

As shown in FIG. 4, process 400 may include receiving a message (block 410). For example, centralized TMAS 380 may receive a message (e.g., an SMS message, an MMS message, or the like) from a CSCF server 370 associated with a sending user device 310 (e.g., a user device 310 that sent the message). The message may include an identifier of a recipient user device 310 of the message (e.g., an e-mail address, a user device number, a telephone number, and/or some other information regarding recipient user device 310). In some implementations, a virtual machine and/or virtual image, implemented by centralized TMAS 380 and functioning as a physical SMSC server associated with sending user device 310, may receive the message.

Process 400 may also include querying an HSS/AAA server for information identifying a recipient CSCF server (block 420), and receiving a query response identifying the recipient CSCF server (block 430). For example, centralized TMAS 380 may query HSS/AAA server 360 for information identifying a CSCF server 370 associated with the recipient. In some implementations, the query may include the identifier of recipient user device 310. Based on receiving the query, HSS/AAA server 360 may identify a particular CSCF server 370 associated with recipient user device 310 (e.g., a recipient CSCF server 370). For example, as described above, HSS/AAA server 360 may maintain information identifying the CSCF server 370 associated with recipient user device 310 based on network registration information associated with recipient user device 310. Once HSS/AAA server 360 identifies recipient CSCF server 370, HSS/AAA server 360 may output information identifying recipient CSCF server 370 to centralized TMAS 380. In some implementations, the information identifying recipient CSCF server 370 may include an IP address of recipient CSCF server 370 and/or some other information that centralized TMAS 380 may use to communicate with recipient CSCF server 370.

Process 400 may further include outputting the message to the recipient CSCF server (block 440). For example, centralized TMAS 380 may output the message to recipient CSCF server 370 based on receiving the query response identifying recipient CSCF server 370. Centralized TMAS 380 may output the message to recipient CSCF server 370 using a SIP protocol. In some implementations, a virtual machine and/or virtual image, implemented by centralized TMAS 380 and functioning as a physical SMSC server associated with recipient user device 310, may output the message to recipient CSCF server 370. For example, a virtual machine and/or virtual image function as a physical SMSC server associated with sender user device 310 may transfer the message to the virtual machine and/or virtual image functioning as a physical SMSC server associated with recipient user device 310.

Based on receiving the message, recipient CSCF server 370 may transmit the message to recipient user device 310. As a result, the message may be transmitted from sender user device 310 to recipient user device 310 without involving multiple, physically implemented, de-centralized SMSC servers that communicate via SS7 protocols, thereby reducing transmission times of the message in relation to when multiple, physically implemented, de-centralized SMSC servers are used for transmitting the message.

Figure 5:
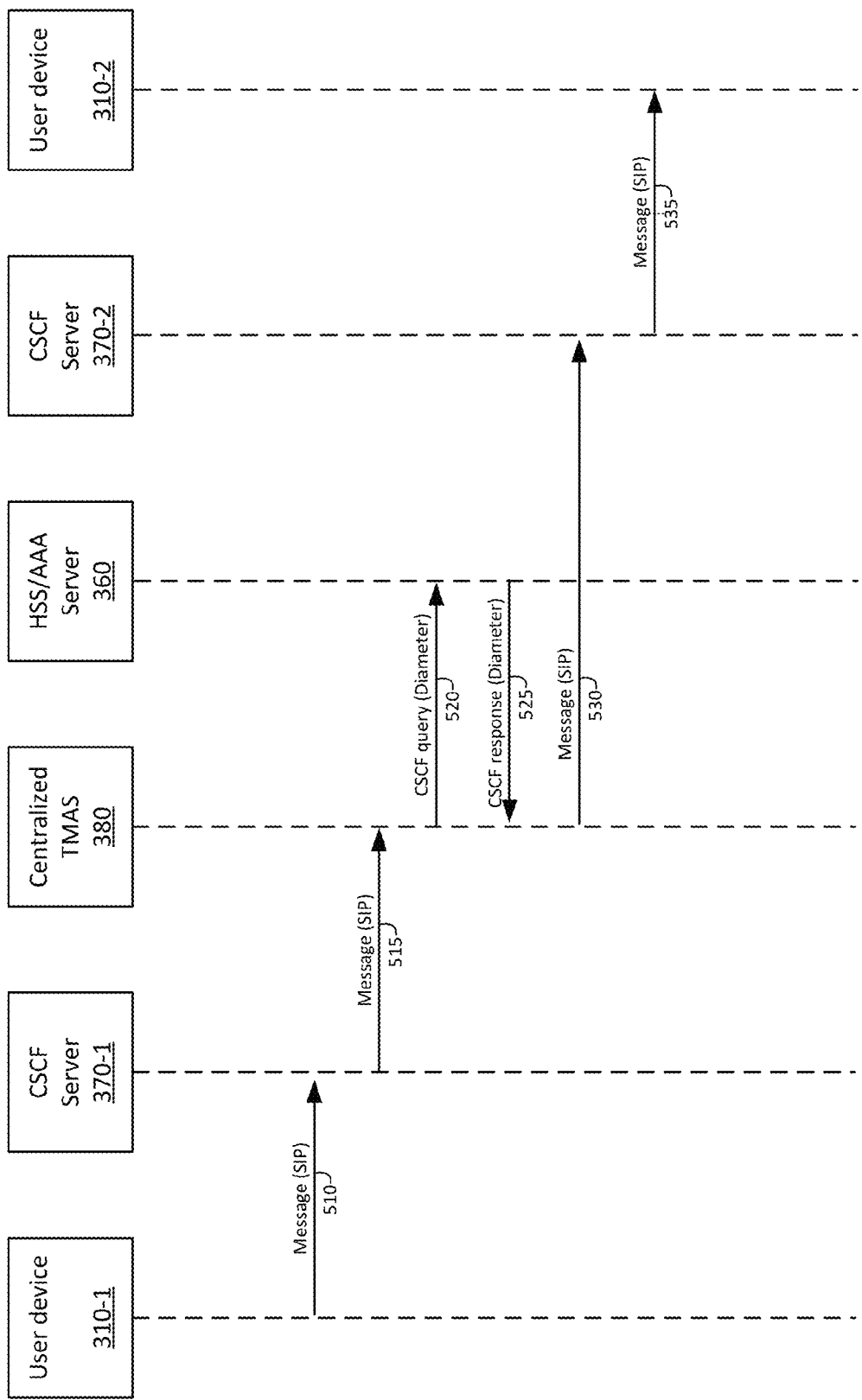
FIG. 5 illustrates a signal flow diagram of example operations for transmitting a message between a sender user device and a recipient user device via a centralized SMSC server.

FIG. 5 illustrates a signal flow diagram of example operations for transmitting a message between a sender user device and a recipient user device via a centralized TMAS. As shown in FIG. 5, a sender user device 310 (e.g., user device 310-1) may transmit a message (at 510) towards a recipient user device 310 (e.g., user device 310-2). In some implementations, the message may be a SIP message transmitted via SIP protocols. A sender CSCF server 370 (e.g., CSCF server 370-1), associated with the user device 310-1, may receive the message, and output the message to centralized TMAS 380 (at 515). In some implementations, the message may be a SIP message and outputted by CSCF server 370-1 via SIP protocols.

Centralized TMAS 380 may query HSS/AAA server 360 (at 520) for information identifying a recipient CSCF server 370 (e.g., CSCF server 370-2) associated with user device 310-2. The query may include an identifier of user device 310-2 included in the message and may be transmitted via a diameter protocol and/or via some other protocol. Based on the identifier of user device 310-2, HSS/AAA server 360 may identify CSCF server 370-2, and output a response to the query to centralized TMAS 380 (at 525). The response to the query may include information identifying CSCF server 370-2 and information that centralized TMAS 380 may use to communicate with CSCF server 370-2. Based on receiving the response to the query, centralized TMAS 380 may output the message (e.g., via a SIP protocol) to CSCF server 370-2 (at 530), and CSCF server 370-2 may output the message (e.g., via a SIP protocol) to user device 310-2 (at 535). In some implementations, a virtual machine and/or virtual image, implemented by centralized TMAS 380 and functioning as a physical SMSC server associated with user device 310-2, may output the message to CSCF server 370-2. As a result, the message may be transmitted via centralized TMAS 380 using SIP protocols, thereby reducing transmission times in relation to when the message is transmitted via multiple de-centralized SMSC servers using SS7 protocols.

Figure 6:
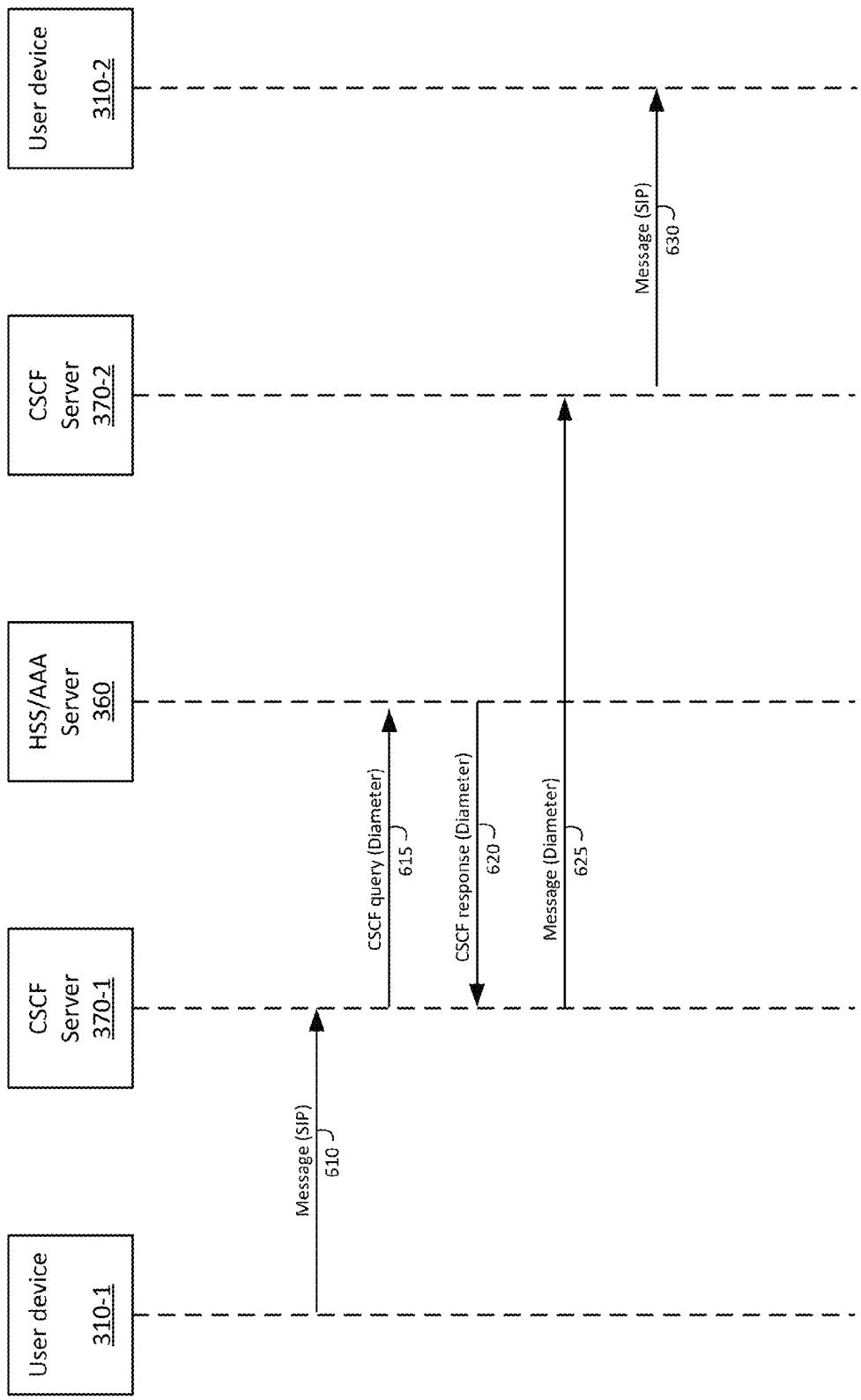
FIG. 6 illustrates a signal flow diagram of example operations for transmitting a message between a sender user device and a recipient user device without involving an SMSC server.

FIG. 6 illustrates a signal flow diagram of example operations for transmitting a message between a sender user device and a recipient user device without involving an SMSC server. As shown in FIG. 6, a sender user device 310 (e.g., user device 310-1) may transmit a message (at 610) towards a recipient user device 310 (e.g., user device 310-2). The message may be transmitted by user device 310-1 via SIP protocols. A sender CSCF server 370 (e.g., CSCF server 370-1), associated with the user device 310-1, may receive the message, and may query HSS/AAA server 360 (at 615) for information identifying a recipient CSCF server 370 (e.g., CSCF server 370-2) associated with user device 310-2 (e.g., via diameter protocols). The query may include an identifier of user device 310-2 included in the message. Based on the identifier of user device 310-2, HSS/AAA server 360 may identify CSCF server 370-2, and output a response to the query (e.g., via diameter protocols) to CSCF server 370-1 (at 620). The response to the query may include information identifying CSCF server 370-2 and information that CSCF server 370-1 may use to communicate with CSCF server 370-2. Based on receiving the response to the query, CSCF server 370-1 may output the message (e.g., via SIP protocols) to CSCF server 370-2 (at 625), and CSCF server 370-2 may output the message (e.g., via SIP protocols) to user device 310-2 (at 630). As a result, the message may be transmitted without involving de-centralized SMSC servers that communicate via SS7 protocols, thereby reducing transmission time in relation to when the message is transmitted via the de-centralized SMSC servers.

Figure 7:
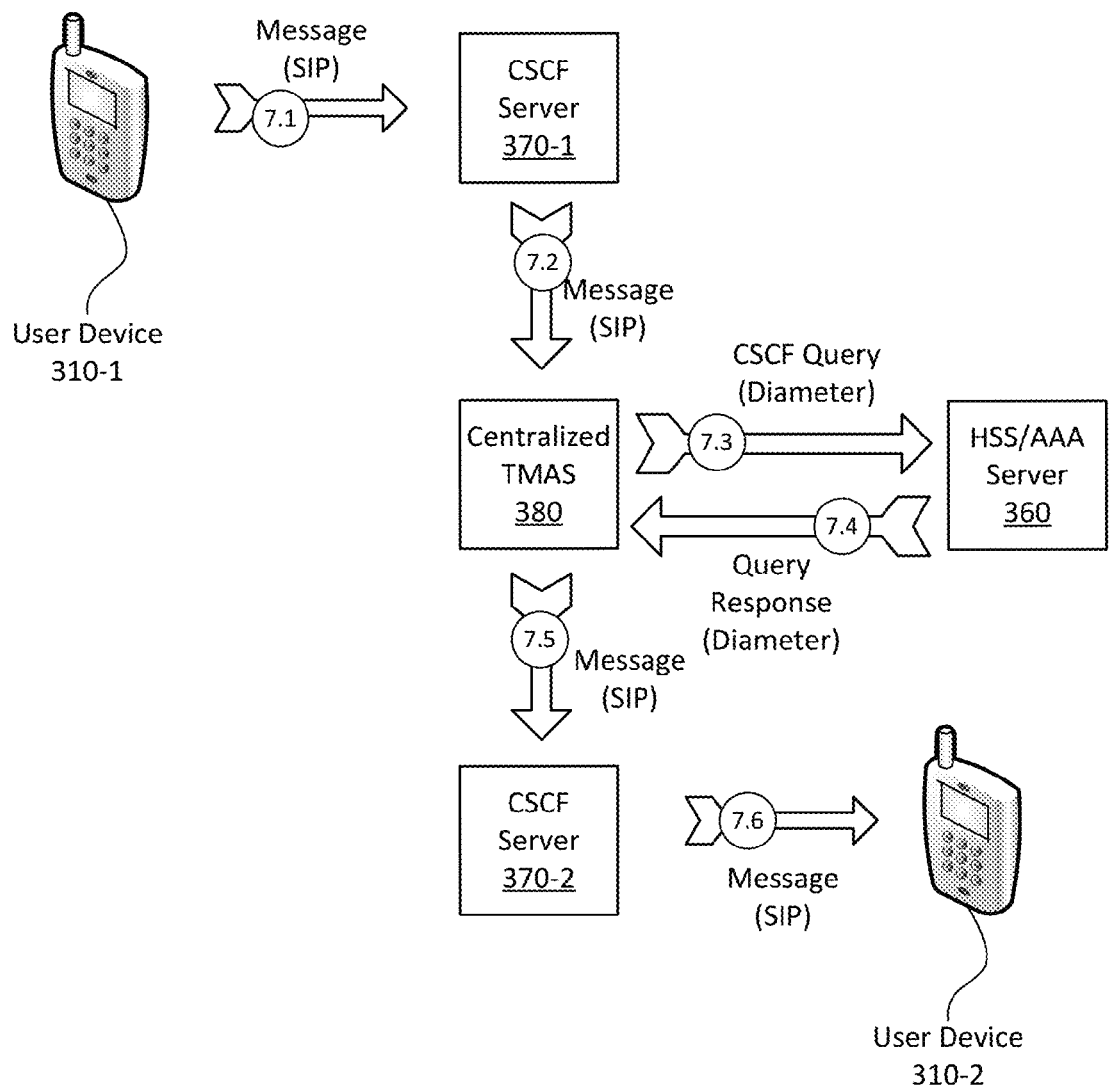
FIG. 7 illustrates an example implementation for transmitting a message via a centralized SMSC server.

FIG. 7 illustrates an example implementation for transmitting a message via a centralized TMAS. As shown in FIG. 7, a sender user device 310 (e.g., user device 310-1) may transmit a message (arrow 7.1) towards a recipient user device 310 (e.g., user device 310-2). A sender CSCF server 370 (e.g., CSCF server 370-1), associated with the user device 310-1, may receive the message, and output the message to centralized TMAS 380 (arrow 7.2). In some implementations, a virtual machine and/or virtual image, implemented by centralized TMAS 380 and functioning as a physical SMSC server associated with user device 310-1, may receive the message.

Centralized TMAS 380 may query HSS/AAA server 360 (arrow 7.3) for information identifying a recipient CSCF server 370 (e.g., CSCF server 370-2) associated with user device 310-2. The query may include an identifier of user device 310-2 included in the message. Based on the identifier of user device 310-2, HSS/AAA server 360 may identify CSCF server 370-2, and output a response to the query to centralized TMAS 380 (arrow 7.4). The response to the query may include information identifying CSCF server 370-2 and information that centralized TMAS 380 may use to communicate with CSCF server 370-2. Based on receiving the response to the query, centralized TMAS 380 may output the message to CSCF server 370-2 (arrow 7.5), and CSCF server 370-2 may output the message to user device 310-2 (arrow 7.6). In some implementations, a virtual machine and/or virtual image, implemented by centralized TMAS 380 and functioning as a physical SMSC server associated with user device 310-2, may output the message to CSCF server 370-2. As a result, the message may be transmitted via centralized TMAS 380, thereby reducing transmission times in relation to when the message is transmitted via multiple de-centralized SMSC servers that communicate via SS7 protocols.

While a particular example is shown in FIG. 7, it will be apparent that the above description is merely an example implementation. Other examples are possible and may differ from what was described with regard to FIG. 7.

Figure 8:
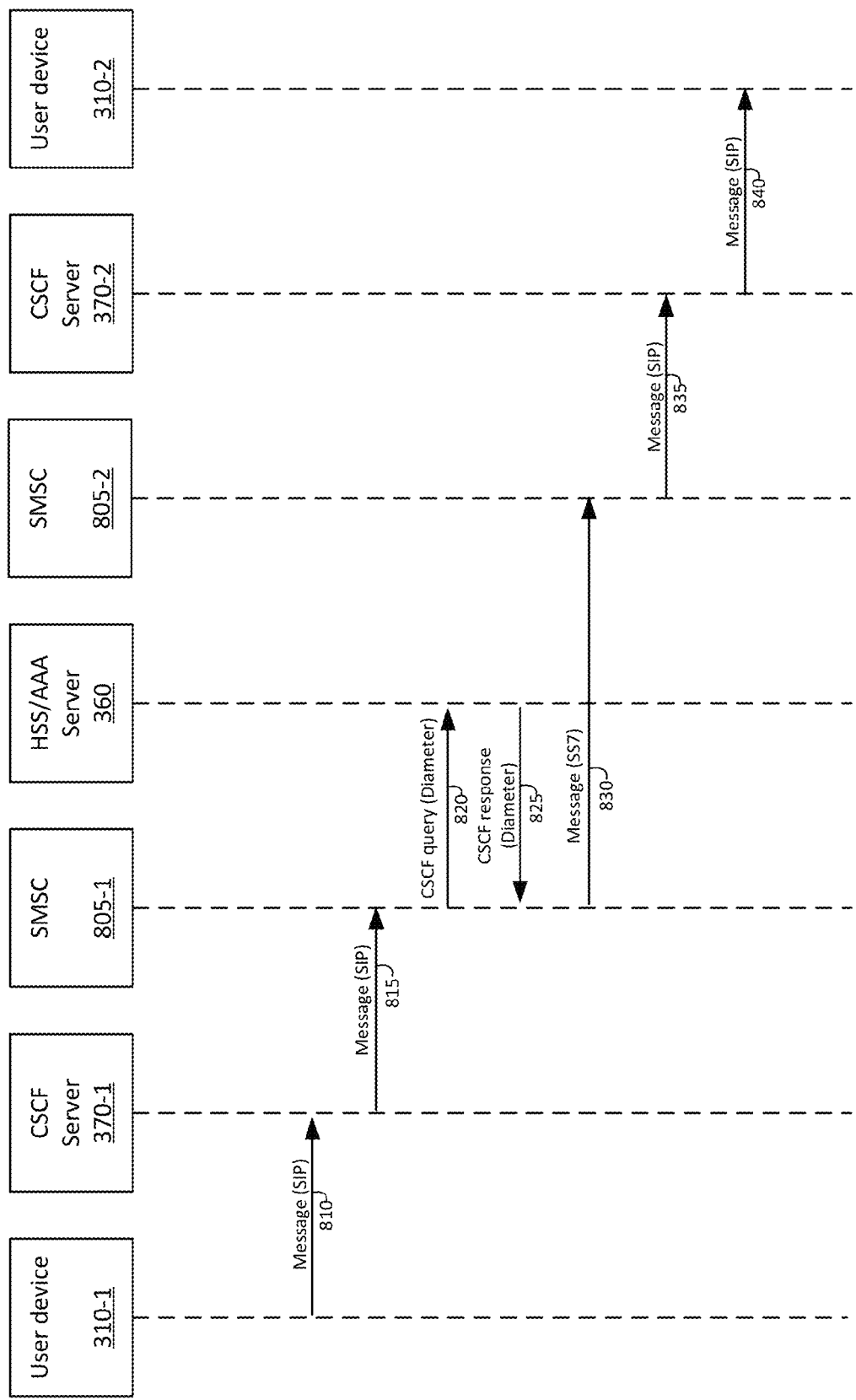
FIG. 8 illustrates a technique in which a centralized SMSC is not used.

FIG. 8 illustrates a signal flow that corresponds to a technique in which a central TMAS is not used. As shown in FIG. 8, user device 310-1 may transmit (at 810) a message (e.g., a SIP message transmitted via SIP protocols) towards CSCF server 370-1, which may forward (at 815) the message to SMSC 805-1. SMSC 805-1 may, in some instances, be an SMSC that has been selected based on its proximity to user device 310-1. SMSC 805-1 may output (at 820) a query to HSS/AA server 360, which may be a request for identifying information for another SMSC (i.e., SMSC 805-2, in this example) that is associated with user device 310-2. HSS/AAA server 360 may provide (at 825) a response to SMSC 805-1, which may include the identifying information for SMSC 805-2. Using the identifying information, SMSC 805-1 may output (at 830) the message to SMSC 805-2, using the SS7 protocol, which may forward (at 835) the message to CSCF server 370-2, for eventual forwarding (at 840) to user device 310-2.

As may be apparent, the additional SS7 messaging (at 830) may be undesirable, as additional delay (e.g., latency) may be introduced, when compared to implementations described above (e.g., with respect to FIG. 5), in which the SS7 messaging is eliminated. Further, more resources may be consumed, in the example of FIG. 8, as additional networks and/or devices may be involved in the processing and transmission of the SS7 messaging.

Figure 9:
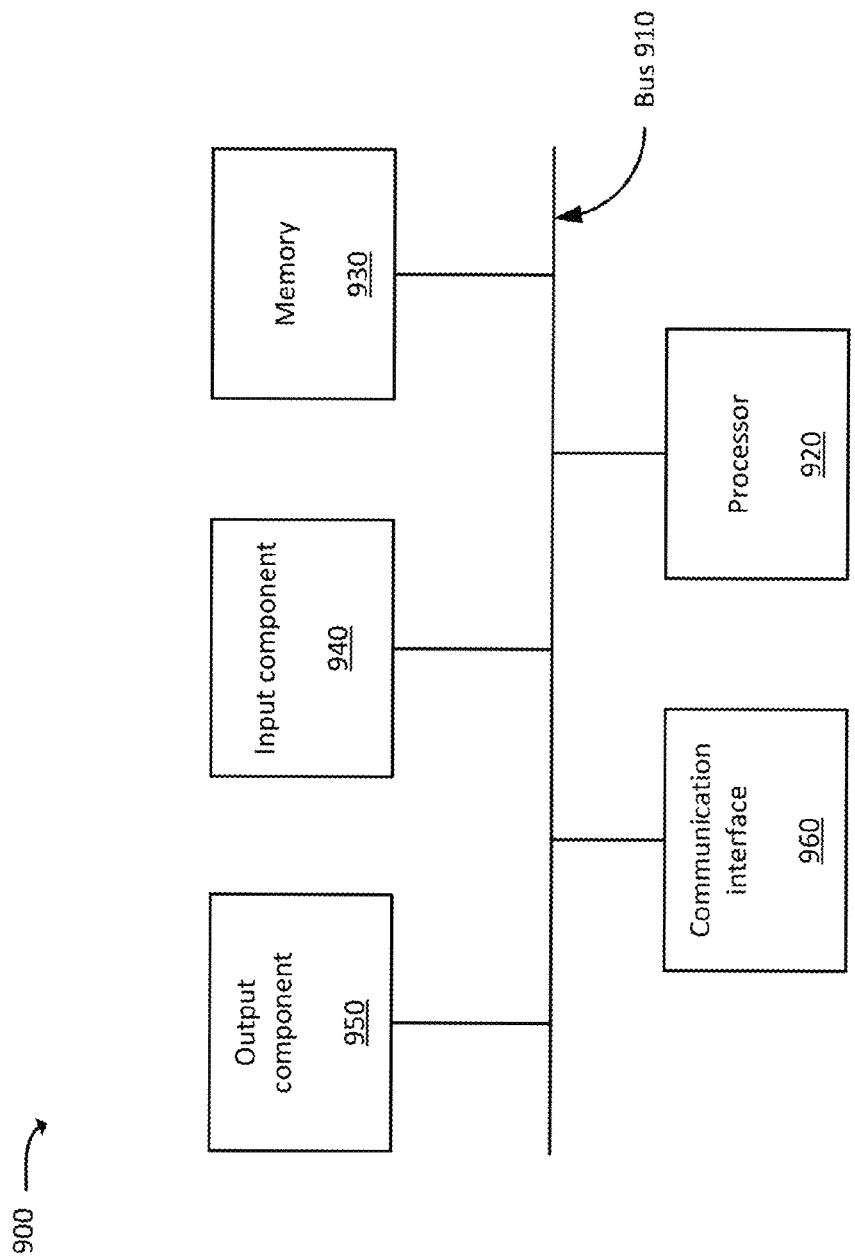
FIG. 9 illustrates example components of one or more devices, according to one or more implementations described herein.

FIG. 9 is a diagram of example components of device 900. One or more of the devices described above (e.g., with respect to FIGS. 1-3, and 5-7) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signal flows have been described with regard to FIGS. 4-6, the order of the blocks and/or signal flows may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1-3, and 5-8), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:

receiving, by a centralized short message service center (SMSC) server device and via a first call session control function (CSCF) server device, a message from a first user device, the message being destined for a second user device, wherein the first CSCF server device is associated with a first Internet Protocol Multimedia Subsystem (IMS) core;

selecting, by the centralized SMSC server device and based on receiving the message, a second CSCF server device, out of a plurality of CSCF server devices, the selected second CSCF server device being associated with the second user device and with a second IMS core that is different from the first IMS core, the selecting including:

querying, by the centralized SMSC server device and after the message is received from the first CSCF server device, a home subscriber server/authentication, authorization, accounting (HSS/AAA) server device, for identification information regarding which CSCF server device, of the plurality of CSCF server devices, is associated with the second user device, wherein the querying of the HSS/AAA server device is performed using Diameter protocol messaging, wherein the HSS/AAA server device stores information relating the plurality of user devices to a plurality of CSCF server devices, including information relating the second user device to the second CSCF server device, wherein the second user device has been registered with the HSS/AAA server device as being associated with the second CSCF server device based on a geographic location of the second user device and a geographic location of the second CSCF server device; and receiving, by the centralized SMSC server device and from the HSS/AAA server device based on the querying, the requested identification information regarding the second CSCF server device, wherein selecting the second CSCF server device is performed based on the identification information, regarding the second CSCF server device, received from the HSS/AAA server device; and outputting, by the centralized SMSC server device and based on the determining, the message to the second user device via the selected second CSCF server device, wherein the outputting includes outputting the message via the selected second CSCF server device using a session initiation protocol (SIP) message, without using signaling system 7 (SS7) protocols.

2. The method of claim 1, wherein the outputting includes outputting the message via the selected CSCF server device without outputting the message to an intervening SMSC server device.

3. The method of claim 1, wherein the centralized SMSC server device implements functionality of multiple SMSC server devices.

4. A centralized short message service center (SMSC) system comprising:

a non-transitory memory device storing a plurality of processor-executable instructions; and a processor configured to execute the processor-executable instructions, wherein executing the processor-executable instructions causes the processor to:

receive, via a first call session control function (CSCF) server device, a message, the message being destined for a second user device, wherein the first CSCF server device is associated with a first Internet Protocol Multimedia Subsystem (IMS) core;

select a second CSCF server device, out of a plurality of CSCF server devices, the selected second CSCF server device being associated with the second user device and with a second IMS core that is different from the first IMS core, the selecting including:

querying, by the centralized SMSC system and after the message is received from the first CSCF device, a home subscriber server/authentication, authorization, accounting (HSS/AAA) server device, for identification information regarding which CSCF server device, of the plurality of CSCF server devices, is associated with the second user device, wherein the querying of the HSS/AAA server device is performed using Diameter protocol messaging, wherein the HSS/AAA server device stores information relating a plurality of user devices to a plurality of CSCF server devices, including information relating the particular user device to the second CSCF server device, wherein the second user device has been registered with the HSS/AAA server device as being associated with the second CSCF server device based on a geographic location of the second user device and a geographic location of the second CSCF server device; and receiving, by the centralized SMSC system and from the HSS/AAA server device based on the querying, the requested identification information regarding the second CSCF server device, wherein selecting the second CSCF server device is performed based on the identification information, regarding the second CSCF server device, received from the HSS/AAA server device; and output, based on the determining, using session initiation protocol (SIP) messaging and without using signaling system 7 (SS7) protocols, the message to the second user device via the second CSCF server device.

5. The centralized SMSC system of claim 4, wherein executing the processor-executable instructions, to output the message, causes the processor to output the message without involving an intervening SMSC server device.

6. The centralized SMSC system of claim 4, wherein the system implements functionality of multiple SMSC server devices.

7. A non-transitory computer-readable medium for storing instructions, the instructions comprising a plurality of instructions which, when executed by one or more processors associated with a centralized short message service center (SMSC) server device, cause the one or more processors to:

receive, by the centralized SMSC server device and via a first call session control function (CSCF) server device, a message, the message being destined for a second user device, wherein the first CSCF server device is associated with a first Internet Protocol Multimedia Subsystem (IMS) core;

select, by the centralized SMSC server device, a second CSCF server device, out of a plurality of CSCF server devices, the selected second CSCF server device being associated with the second user device and with a second IMS core that is different from the first IMS core, the selecting including:

querying, by the centralized SMSC server device and after the message is received from the first CSCF server device, a home subscriber server/authentication, authorization, accounting (HSS/AAA) server device, for identification information regarding which CSCF server device, of the plurality of CSCF server devices, is associated with the second user device, wherein the querying of the HSS/AAA server device is performed using Diameter protocol messaging, wherein the HSS/AAA server device stores information relating a plurality of user devices to the plurality of CSCF server devices, including information relating the second user device to the particular CSCF server device, wherein the second user device has been registered with the HSS/AAA server device as being associated with the second CSCF server device based on a geographic location of the second user device and a geographic location of the second CSCF server device; and receiving, by the centralized SMSC server device and from the HSS/AAA server device based on the querying, the requested identification information regarding the second CSCF server device, wherein selecting the second CSCF server device is performed based on the identification information, regarding the second CSCF server device, received from the HS S/AAA server device; and output, by the centralized SMSC server device and based on the determining, using session initiation protocol (SIP) messaging and without using signaling system 7

(SS7) protocols, the message to the second user device via the second CSCF server device.

8. The non-transitory computer-readable medium of claim 7, wherein one or more instructions, of the plurality of instructions, to output the message, causes the one or more processors to output the message without involving an intervening SMSC server device.

9. The non-transitory computer-readable medium of claim 7, wherein the centralized SMSC server device implements functionality of multiple SMSC server devices.

10. The method of claim 1, wherein the information stored by the HSS/AAA server device includes information regarding CSCF server devices of multiple IMS cores.

* * * * *